United States Patent
Laselva et al.

(10) Patent No.: US 12,003,460 B2
(45) Date of Patent: Jun. 4, 2024

(54) DATA TRANSMISSION USING BANDWIDTH PARTS

(71) Applicant: Nokia Technologies Oy, Espoo (FI)

(72) Inventors: Daniela Laselva, Klarup (DK); Frank Frederiksen, Klarup (DK); Klaus Ingemann Pedersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 407 days.

(21) Appl. No.: 17/288,059

(22) PCT Filed: Nov. 5, 2018

(86) PCT No.: PCT/EP2018/080145
§ 371 (c)(1),
(2) Date: Apr. 23, 2021

(87) PCT Pub. No.: WO2020/094208
PCT Pub. Date: May 14, 2020

(65) Prior Publication Data
US 2021/0385053 A1    Dec. 9, 2021

(51) Int. Cl.
*H04L 5/00* (2006.01)
*H04L 1/1812* (2023.01)
*H04L 1/1829* (2023.01)
*H04L 1/1867* (2023.01)
*H04W 72/044* (2023.01)
*H04W 72/23* (2023.01)

(52) U.S. Cl.
CPC .......... *H04L 5/0092* (2013.01); *H04L 1/1819* (2013.01); *H04L 1/1848* (2013.01); *H04L 1/188* (2013.01); *H04W 72/044* (2013.01); *H04W 72/23* (2023.01)

(58) Field of Classification Search
CPC ..... H04L 1/1819; H04L 1/1848; H04L 1/188; H04L 5/001; H04L 5/0092; H04L 5/0098; H04W 72/044; H04W 72/23
USPC ........................................................ 370/329
See application file for complete search history.

(56) References Cited

U.S. PATENT DOCUMENTS

2013/0083749 A1    4/2013    Xu et al.
2016/0173232 A1    6/2016    Mallik et al.
(Continued)

FOREIGN PATENT DOCUMENTS

CN    1729664 A    2/2006
CN    105580445 A    5/2016
(Continued)

OTHER PUBLICATIONS

3GPP TSG-RAN WG1 Meeting #90bis, Prague, Czech Republic, Oct. 9-13, 2017, R1-1717077, "Remaining issues on bandwidth part", Huawei, HiSilicon, 12 pgs.
(Continued)

*Primary Examiner* — Robert J Lopata
(74) *Attorney, Agent, or Firm* — Barta Jones, PLLC

(57) ABSTRACT

A method includes: detecting a need for a retransmission of a data transmission on one or more bandwidth parts (BWP) between a user apparatus and a radio access network; and in response to detecting the need for the retransmission, resetting a timer, wherein an expiration of the timer causes automatic switching from using the one or more BWPs for the data transmission to using a default BWP for the data transmission.

20 Claims, 4 Drawing Sheets

(56) References Cited

U.S. PATENT DOCUMENTS

| | | | |
|---|---|---|---|
| 2019/0089494 A1* | 3/2019 | Park | H04L 1/1809 |
| 2019/0158229 A1* | 5/2019 | Wei | H04L 1/1812 |
| 2019/0208506 A1* | 7/2019 | Baldemair | H04L 1/1825 |
| 2020/0396628 A1* | 12/2020 | Kim | H04L 5/003 |
| 2021/0044392 A1* | 2/2021 | Myung | H04L 1/1864 |
| 2021/0076445 A1* | 3/2021 | Tsai | H04L 5/003 |

FOREIGN PATENT DOCUMENTS

| | | |
|---|---|---|
| CN | 106576299 A | 4/2017 |
| CN | 106576300 A | 4/2017 |

OTHER PUBLICATIONS

3GPP TSG-RAN WG2 Meeting #99bis, Prague, Czech Republic, Oct. 9-13, 2017, R2-1710592, "Overall impact in RAN2 for BWP", Intel Corporation, 8 pgs.

3GPP TAG-RAN WG2 NR #101 Meeting, Athens, Greece, Feb. 26-Mar. 2, 2018, R2-1802464, "Further considerations for BWP switching", Samsung, 6 pgs.

"3rd Generation Partnership Project; Technical Specification Group Radio Access Network; NR; Radio Resource Control (RRC) protocol specification (Release 15)", 3GPP TS 38.331, V15.1.0, Mar. 2018, pp. 1-268.

"3rd Generation Partnership Project; Technical Specification Group Radio Access Network; NR; Physical layer procedures for data (Release 15)", 3GPP TS 38.214, V15.2.0, Jun. 2018, pp. 1-94.

"3rd Generation Partnership Project; Technical Specification Group Radio Access Network; NR; Physical layer procedures for control (Release 15)", 3GPP TS 38.213, V15.2.0, Jun. 2018, pp. 1-99.

"3rd Generation Partnership Project; Technical Specification Group Radio Access Network; NR; Medium Access Control (MAC) protocol specification (Release 15)", 3GPP TS 38.321, V15.2.0, Jun. 2018, pp. 1-73.

"3rd Generation Partnership Project; Technical Specification Group Radio Access Network; NR; NR and NG-RAN Overall Description; Stage 2 (Release 15)", 3GPP TS 38.300, V15.2.0, Jun. 2018, pp. 1-87.

"New SID: Study on UE Power Saving in Nr", 3GPP TSG RAN Meetings #80, RP-181463, Agenda Item: 9.1.8, CATT, Jun. 11-14, 2018, 5 pages.

"3rd Generation Partnership Project; Technical Specification Group Radio Access Network; NR; Physical channels and modulation (Release 15)", 3GPP TS 38.211, V15.3.0, Sep. 2018, pp. 1-96.

International Search Report and Written Opinion received for corresponding Patent Cooperation Treaty Application No. PCT/EP2018/080145, dated Jul. 29, 2019, 12 pages.

Office Action received for corresponding Indian Patent Application No. 202147024340, dated Apr. 7, 2022, 6 pages.

Office Action received for corresponding European Patent Application No. 18796944.9, dated Aug. 30, 2023, 8 pages.

Notice of Allowance received for corresponding European Patent Application No. 18796944.9, dated Nov. 15, 2023, 9 pages.

Office Action received for corresponding Chinese Patent Application No. 201880099258.8, dated Jan. 26, 2024, 10 pages of Office Action and no page of translation available.

"New Radio (NR) Access Technology", 3GPP TSG RAN meeting #76, RP-171137, Agenda item: 9.2.1, NTT Docomo, Inc, Jun. 5-8, 2017, pp. 1-218.

Yu et al., "A Scheme of IUB Flow Control based on RLC Retransfer Ratio Observation", Communications Technologies, Apr. 10, 2009, pp. 56-58.

\* cited by examiner

DATA TRANSMISSION USING BANDWIDTH PARTS

CROSS REFERENCE TO RELATED APPLICATION

This patent application is a U.S. National Stage application of International Patent Application Number PCT/EP2018/080145 filed Nov. 5, 2018, which is hereby incorporated by reference in its entirety.

FIELD

Various example embodiments relate to data transmission.

BACKGROUND

Bandwidth parts (BWP) are used for wireless data transmission. A user apparatus may be allocated a default BWP and one or more BWPs. During re-transmissions, the configuration for the use of the BWP may vary.

BRIEF DESCRIPTION

According to an aspect, there is provided subject matter of independent claims. Dependent claims define some example embodiments.

One or more examples of implementations are set forth in more detail in the accompanying drawings and the description of embodiments.

LIST OF DRAWINGS

Some example embodiments will now be described with reference to the accompanying drawings, in which FIG. 1 illustrates an example embodiment of a general architecture of a system for data transmission;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the example embodiments and in the claims, serve to illustrate the example embodiments with reference to the drawings, without limiting it to these examples only.

In the following, different example embodiments will be described using, as an example of an access architecture to which the embodiments may be applied, a radio access architecture based on long term evolution advanced (LTE Advanced, LTE-A) or new radio (NR, 5G), or future cellular technologies (e.g. 6G or the like) without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
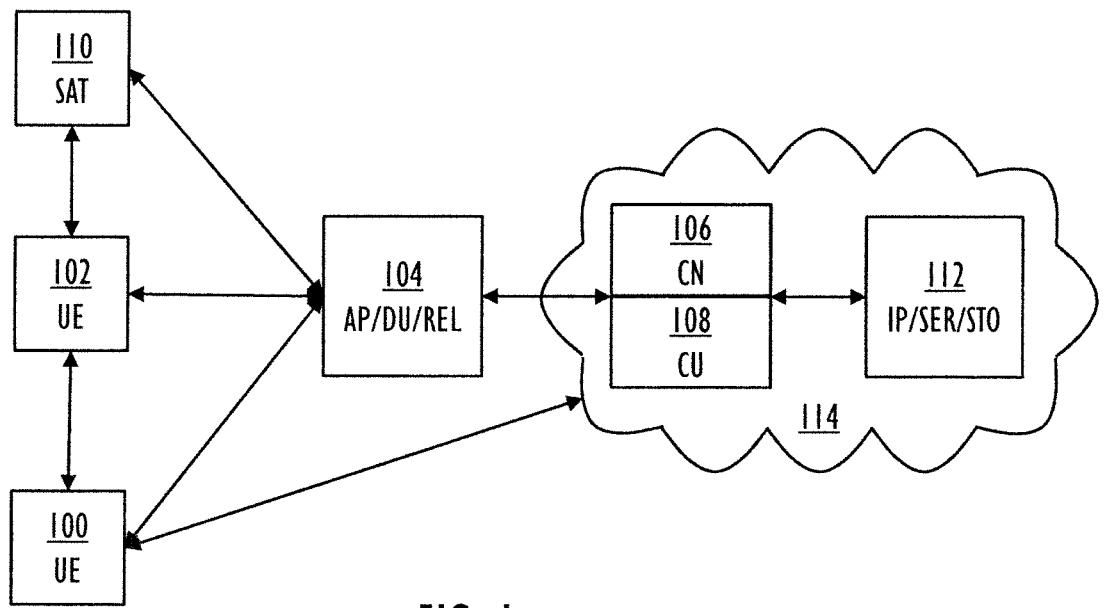

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures besides those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user apparatuses 100 and 102 configured to be in a wireless connection on one or more communication channels in a cell with an access node (such as (e/g)NodeB) 104 providing the cell. The physical link from the user apparatus 100, 102 to the (e/g)NodeB 104 is called uplink or reverse link and the physical link from the (e/g)NodeB 104 to the user apparatus 100, 102 is called downlink or forward link. It should be appreciated that (e/g)NodeBs or their functionalities may be implemented by using any node, host, server or access point etc. entities suitable for such a usage, for example according to a higher layer split architecture, comprising a central-unit (so-called gNB-CU) controlling one or more distributed units (so-called gNB-DU).

A communications system typically comprises more than one (e/g)NodeB 104 in which case the (e/g)NodeBs 104 may also be configured to communicate with one another through logical interfaces (such Xn/X2) running over links, wired or wireless, designed for the purpose. These interfaces may be used for data and signaling purposes. The (e/g)NodeB 104 is a computing device configured to control the radio resources of communication system it is coupled to. The NodeB 104 may also be referred to as a base station, an access point or any other type of interfacing device including a relay station capable of operating in a wireless environment. The (e/g)NodeB 104 includes or is coupled to transceivers. From the transceivers of the (e/g)NodeB 104, a connection is provided to an antenna unit that establishes bi-directional radio links to user apparatuses 100, 102. The antenna unit may comprise a plurality of antennas or antenna elements (sometimes also referred to as antenna panels, or transmission and reception points, TRP). The (e/g)NodeB 104 is further connected to a core network 106 (CN or next generation core NGC). Depending on the system, the counterpart on the CN side can be a serving gateway (S-GW, routing and forwarding user data packets), packet data network gateway (P-GW), for providing connectivity of user apparatuses 100, 102 to external packet data networks, or mobile management entity (MME), access and mobility function (AMF), etc.

The user apparatus 100, 102 (also called user equipment UE, user terminal, terminal device, subscriber terminal, etc.) illustrates one type of an apparatus to which resources on the air interface are allocated and assigned, and thus any feature described herein with a user apparatus may be implemented with a corresponding apparatus, such as a relay node. An example of such a relay node is a layer 3 relay (self-backhauling relay) towards the base station.

The user apparatus 100, 102 typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that the user apparatus 100, 102 may also be a nearly exclusive uplink only device, of which an example is a camera or video camera loading images or video clips to a network. The user apparatus 100, 102 may also be a device having capability to operate in Internet of Things (IoT) network which is a scenario in which objects are provided with the ability to transfer data over a network without requiring human-to-human or human-to-computer interaction. One technology in the above network may be denoted as narrowband Internet of Things (NB-Iot). The user apparatus 100, 102 may also be a device having capability to operate utilizing enhanced machine-type communication (eMTC). The user apparatus 100, 102 may also utilize cloud. In some applications, the user apparatus 100, 102 may comprise a small portable device with radio parts (such as a watch, earphones or eyeglasses) and the computation is carried out in the cloud. The user apparatus 100, 102 (or in some embodiments a layer 3 relay node) is configured to perform one or more of user equipment functionalities. The user apparatus 100, 102 may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE, including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, above 6 GHz-mmWave, possibly using the same radio interfaces but with different parametrization). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is typically fully distributed in the radio and fully centralized in the core network. The low latency applications and services in 5G require to bring the content close to the radio which leads to local break out and mobile edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent.

Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs 104, the user apparatus 100, 102 may have access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e/g)NodeBs 104 of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs 104 are required to provide such a network structure.

For fulfilling the need for improving the deployment and performance of communication systems, the concept of "plug-and-play" (e/g)NodeBs 104 has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). An HNB Gateway (HNB-GW), which is typically installed within an operator's network may aggregate traffic from a large number of HNBs back to a core network.

As mentioned, radio access network may be split into two logical entities called Central Unit (CU) 108 and Distributed Unit (DU) 104. In prior art, both CU and DU supplied by the same vendor. Thus, they are designed together and interworking between the units is easy. The interface between CU and DU is currently being standardized by 3GPP and it is denoted F1 interface. Therefore, in the future the network operators may have the flexibility to choose different vendors for CU and DU. Different vendors may provide different failure and recovery characteristics for the units. If the failure and recovery scenarios of the units are not handled in a coordinated manner, it will result in inconsistent states in the CU and DU (which may lead to subsequent call failures, for example). Thus, there is a need to enable the CU and DU from different vendors to coordinate operation to handle failure conditions and recovery, considering the potential differences in resiliency capabilities between the CU and DU.

Figure 2:
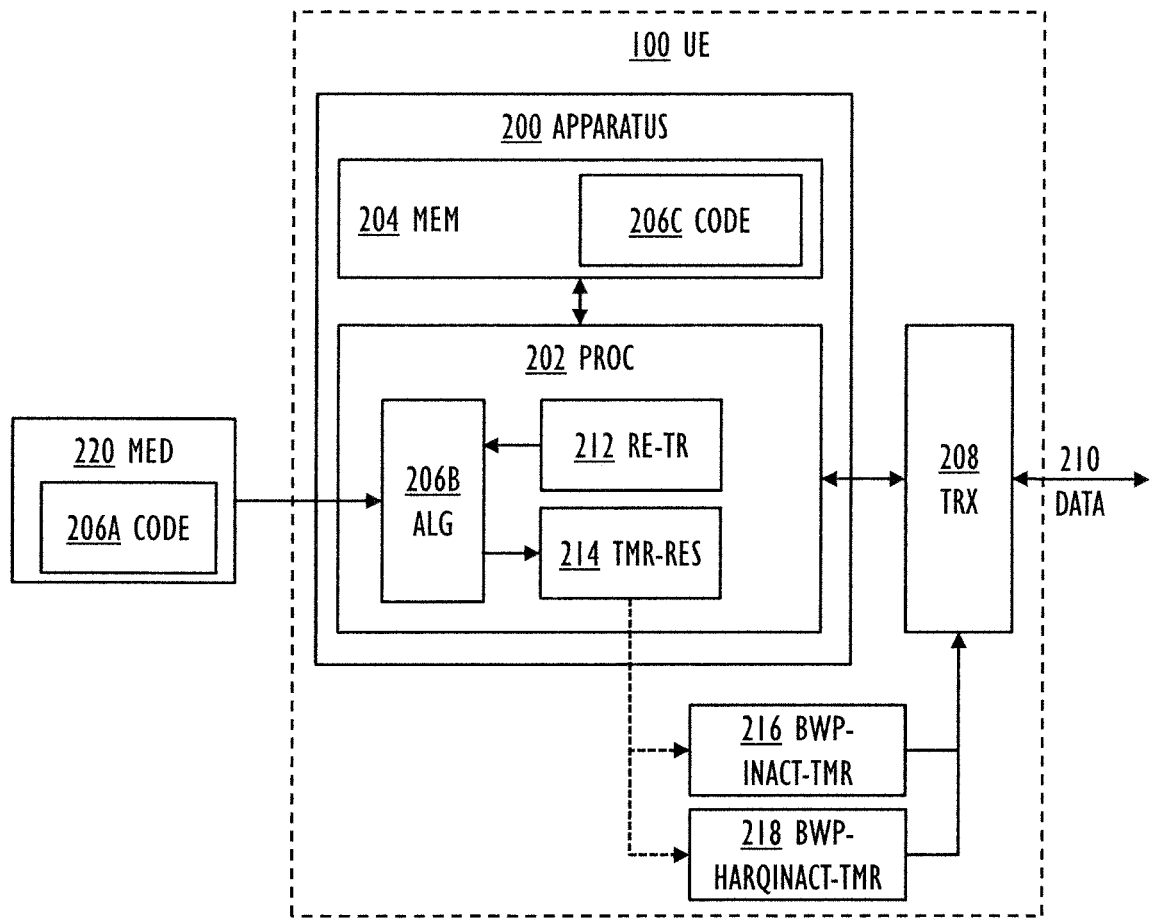
FIG. 2 and FIG. 3 illustrate example embodiments of an apparatus.
Figure 3:
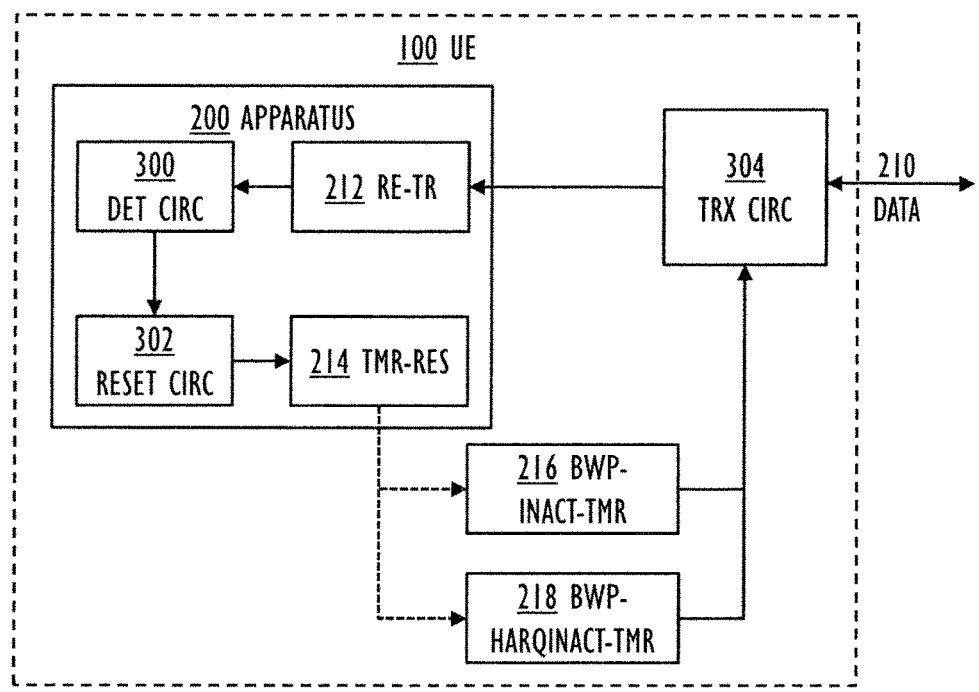
Figure 6A:
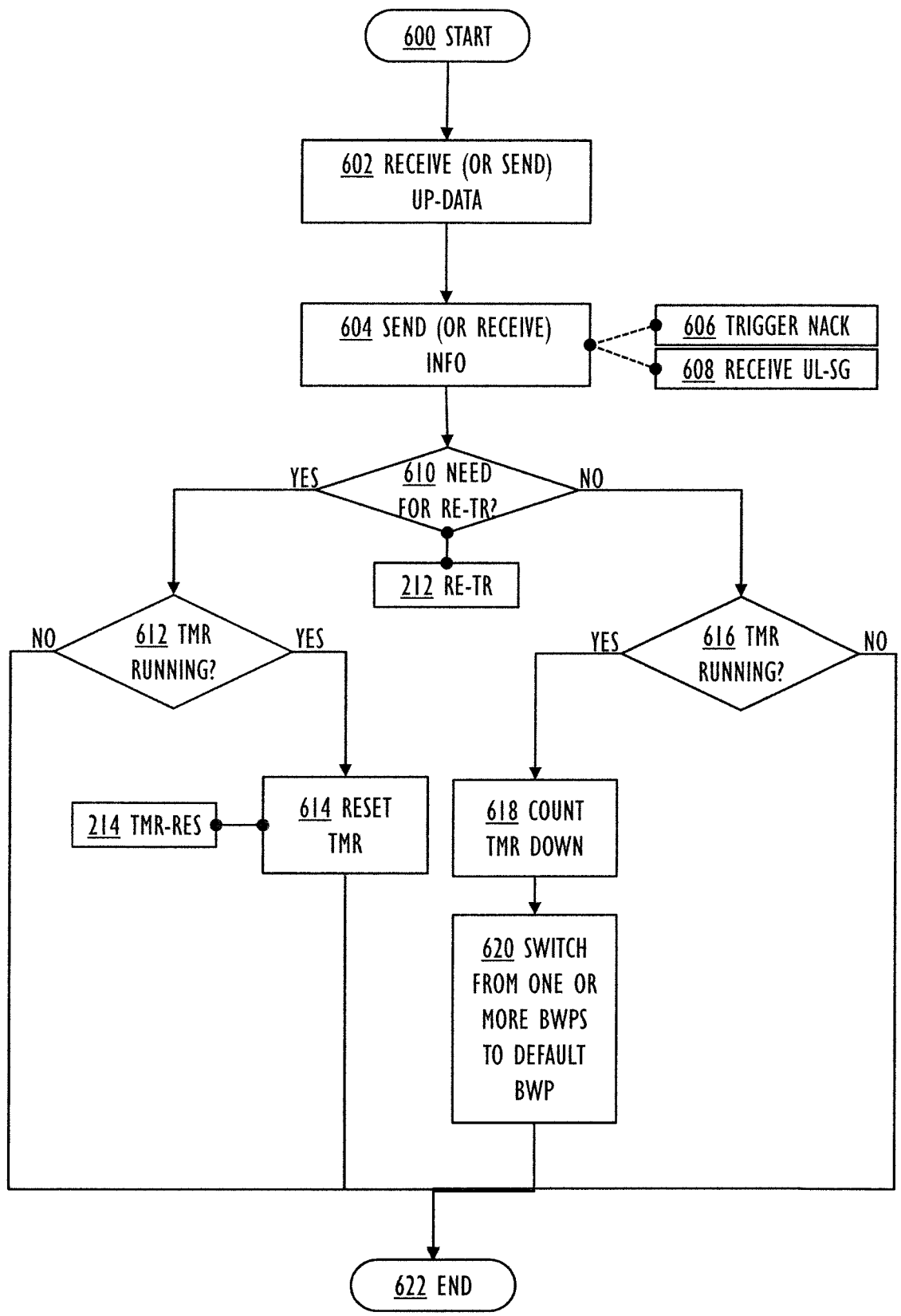
FIG. 6A, FIG. 6B, FIG. 6C and FIG. 6D illustrate example embodiments of a method.

Let us study simultaneously both FIG. 2 and FIG. 3, which illustrate example embodiments of an apparatus 200, and FIG. 6A, which illustrates example embodiments of a method performed by the apparatus 200.

In an example embodiment, the apparatus 200 is the user apparatus 100.

In an example embodiment, the apparatus 200 is a circuitry.

In an example embodiment, the apparatus 200 is a combination of a processor, memory and software.

In an example embodiment of FIG. 2, the apparatus 200 comprises one or more processors 202, and one or more memories 2024 including computer program code 206C. The one or more memories 204 and the computer program code 206B, 206C are configured to, with the one or more processors 202, cause the performance of the apparatus 200.

The term 'processor' 202 refers to a device that is capable of processing data. Depending on the processing power needed, the apparatus 200 may comprise several processors 202 such as parallel processors or a multicore processor. When designing the implementation of the processor 202, a person skilled in the art will consider the requirements set for the size and power consumption of the apparatus 200, the necessary processing capacity, production costs, and production volumes, for example. The processor 202 and the memory 204 may be implemented by an electronic circuitry.

A non-exhaustive list of implementation techniques for the processor 202 and the memory 204 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 204 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 206A, 206B, 206C may be implemented by software. In an example embodiment, the software may be written by a suitable programming language, and the resulting executable code 206C may be stored on the memory 204 and run by the processor 202.

The one or more memories 202 and the computer program code 206B, 206C are configured to, with the one or more processors 202, cause the apparatus 200 at least to perform an algorithm 206B illustrated in FIG. 6A as the method. As explained above, the functionality of the algorithm 206B may be realized by suitably programmed and executed software or by appropriately designed hardware.

In an example embodiment, the apparatus 200 comprises means for causing the apparatus 200 to perform the method.

The operations are not strictly in chronological order in FIG. 6A, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method starts in 600.

In 602, data transmission (by receiving or sending) is performed as user plane data is received or send on one or more bandwidth parts BWP. The data transmission is realized by one or more wireless transceivers 208 of the user apparatus 100.

Figure 4:
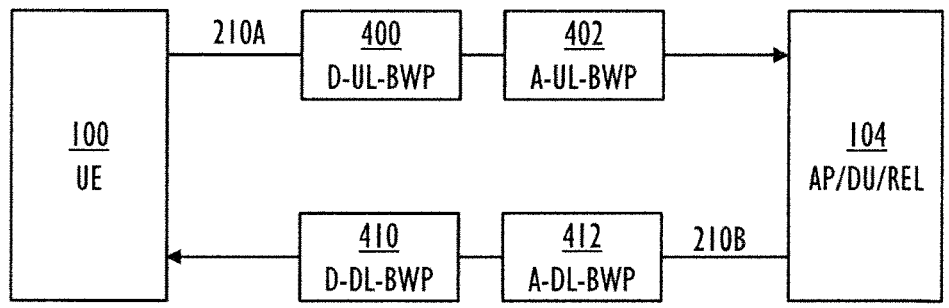
FIG. 4 illustrates an example embodiment of data transmission.

An example embodiment of this is illustrated in FIG. 4, wherein an uplink connection 210A from the user apparatus 100 to the radio access network, or, more precisely, to the access node 104 of the radio system, uses a default uplink BWP 400 and one or more uplink BWPs 402, and a downlink connection 210B from the access node 104 to the user apparatus 100 uses a default downlink BWP 410 and one or more downlink BWPs 412.

Figure 5:
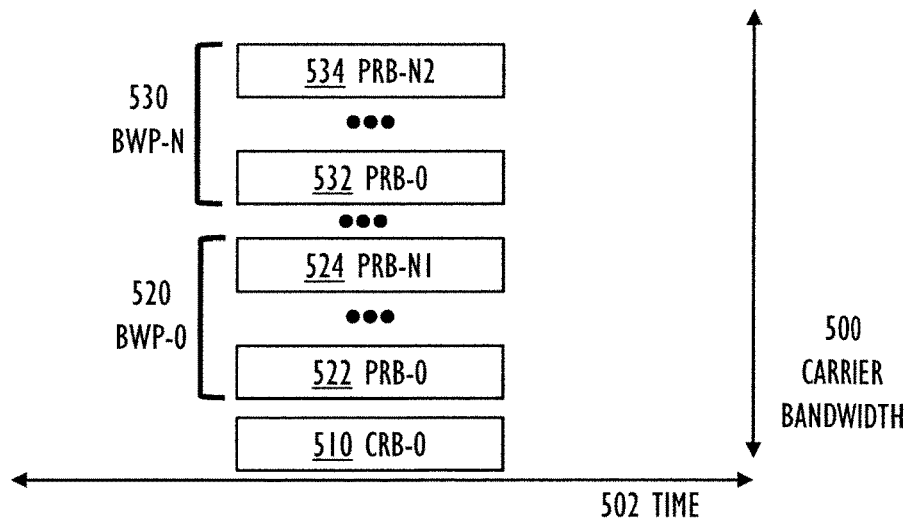
FIG. 5 illustrates an example embodiment of bandwidth parts.

Let us study FIG. 5 illustrating an example embodiment of bandwidth parts BWP. Briefly, within one component carrier, defined by a carrier bandwidth 500 and time 502, BWP is supported on downlink and uplink. The bandwidth 500 of the component carrier may be divided into several bandwidth parts 520, 530. From network perspective, different bandwidth parts may be associated with different numerologies (subcarrier spacing, cyclic prefix (CP)).

A user apparatus 100 with smaller bandwidth support capability may work within a bandwidth part with an associated numerology. Hereby, user apparatuses 100, 102 with different bandwidth support capability may function on a component carrier with a larger bandwidth. NR supports UE bandwidth part adaptation for UE power saving and numerology switching. The numerology refers to a physical layer numerology, subcarrier spacing and CP, for example. The network may operate on a wide bandwidth carrier while it is not required for the user apparatus 100, 102 to support the whole bandwidth carrier, but may work over activated bandwidth parts, thereby optimizing the use of radio resources to the traffic demand and minimizing interference to/from other systems. The example embodiments enable flexible and restricted spectrum use with the aim of reducing UE power consumption, with focus on the BWP.

A carrier bandwidth part is defined in chapter 4.4.5 "Bandwidth part" of "3GPP TS 38.211 V15.3.0 (2018-09), Technical Specification, 3rd Generation Partnership Project; Technical Specification Group Radio Access Network; NR; Physical channels and modulation (Release 15)".

Carrier bandwidth part 520, 530 is a contiguous set of physical resource blocks PRB 522-524, 532-534, selected from a contiguous subset of the common resource blocks for a given numerology(u) and cyclic prefix on a given carrier. CRB0 510 stands for Common resource block which is numbered from the one end through the other end of Carrier Band (this is a kind of global resource block).

In an example embodiment, the carrier bandwidth part may be illustrated as follows, taking the Release 14 of NR as an example:

NR largest FFT size is 4k, which corresponds to a maximum BWP of 400 MHz with 120 kHz SCS (Subcarrier spacing) and 275 PRBs (Physical resource blocks), respectively.

NR supports the following numerologies {15, 30, 60 kHz} SCS in FR1 (Frequency range) (<6 GHz) and {60,120 kHz} in FR2 (>6 GHz).

NR supports BWP sizes between 24 and 275 PRB.

In NR, all UEs support BW of 100 MHz in FR1 (<6 GHz) and 200 MHz in FR2 (>6 GHz).

BWP in NR replaces component carrier (CC) from UE's point of view.

For paired spectrum (FDD), UE can be configured with initial DL and UL BWPs and up to 4 DL and up to 4 UL BWPs in a serving cell.

Only one carrier bandwidth part may be active at a given time.

The UE is not expected to transmit or receive PDSCH (Physical downlink shared channel), PDCCH (Physical downlink control channel), CSI-RS (Channel-state information reference signal), or TRS (Tracking reference signal) outside an active bandwidth part. This means that the resource allocation in frequency to a UE should be within its active BWP(s) using the associated numerology.

The HARQ retransmission across different BWPs is supported when a UE's active BWP is switched.

In case of BA (Bandwidth Adaptation), the UE only acquires SI (System information) on the active BWP.

RRC (Radio resource control) parameters for Bandwidth Part DL configuration include BWP-Id, which is an identifier for this bandwidth part. Other parts of the RRC configuration use the BWP-Id to associate themselves with a particular bandwidth part. The BWP-d=0 is always associated with the initial BWP and may hence not be used here (in other bandwidth parts). So initial=0, first dedicated= 1, . . . ). If the NW configures four dedicated bandwidth parts, they are identified by DCI (Downlink control information) code. CORESET #0 (Control resource block) defines span of initial-active BWP.

BWP types may be:

Initial-active DL BWP #0: defined by span of CORESET #0 configured by MIB (Master information block) for SIBs (System information block) scheduling, determines DCI format 1_0/0_0 (DL/UL fall-back) size in CSS, and supported sizes are only 24,48,96 RB.

Initial-active UL BWP #0: configured by SIB1 for random access (RA) procedure, and determines RA field size in DCI format 0_0 (UL fall-back).

Default DL BWP or DL/UL BWP pair: configured by dedicated RRC as BWP to be switched-to when inactivity-timer expires. If not configured, default DL BWP is initial-active DL BWP.

First-active DL and UL BWP (TBC): on Primary Cell (Pcell), the first active BWP after initial access, on Primary Secondary Cell (PScell), the first active BWP after random access, and on Scell, the first active BWP after activation by MAC-CE (Medium Access Control Control Element).

Dedicated DL and UL BWP: regular BWP configured in dedicated manner.

In an example embodiment, the one or more BWPs 402, 412 is one or more active bandwidth parts of a component carrier allocated during a connected mode for the user apparatus 100.

In an example embodiment, the default BWP 400, 410 is an initial active bandwidth part allocated during an initial access by the user apparatus 100.

In 604, information is sent or received, and, in 610, it is checked whether the information includes a need for a re-transmission of the data transmission on the one or more bandwidth parts 402, 412 between the user apparatus 100 and the radio access network 104. Reception of the need for the re-transmission means that data transmission did not wholly succeed, whereby some kind of retransmission is required.

Altogether, in operations 604 and 610, it is detected 604, 610YES the need for the re-transmission for the data transmission 210, 210A, 210B on the one or more bandwidth parts BWP 402, 412 (uplink or downlink) between the user apparatus 100 and the radio access network 104.

In response to detecting 604, 610YES the need for the re-transmission 212, a timer is reset in 614. Prior to this, it may be checked in 612 if the timer is running: if not 612NO, the method ends in 622, else the timer is reset in 614. Note that the term "timer reset" includes at least the following cases: the timer is stopped and then started anew, or that the timer is just restarted on-the-fly without first stopping it.

The expiration 618 of the timer would cause automatic switching in 620 from using the one or more BWPs 402, 412 for the data transmission 210, 210A, 210B to using the default BWP 400, 410 for the data transmission 210, 210A, 210B. As the timer is reset in 614, the automatic switching in 620 does not happen, whereby the one or more BWPs 402, 412 is continued to use for the data transmission 210, 210A, 210B. This branch in FIG. 6A goes from 610NO to 616, wherein it may be checked whether the timer is still running. If the timer is running 616YES, the timer continues to count down in 618 until it expires and automatic switching from using the one or more BWPs 402, 412 to using the default BWP 400, 410 takes place. Else, if the timer is not running 616NO, the method ends in 622.

In an example embodiment, the need for the re-transmission 212 is detected 604, 610YES in response to triggering 606 a negative acknowledgement (NACK) transmission to the radio access network 104 when using a hybrid automatic repeat request (HARQ) for the data transmission 210, 210A, 210B. This corresponds to transmitting the NACK from the user apparatus 100 in response to a received downlink data transmission 210B in the one or more downlink BWPs 412.

In an alternative or additional example embodiment, the need for the re-transmission 212 is detected 604, 610YES in response to receiving 608 an uplink (UL) scheduling grant for the data transmission 210, 210A, 210B from the radio access network 104. The network sends an UL scheduling grant indicating that retransmission is needed (i.e., Downlink Control Indication, DCI, indicating a different Redundancy Version, RV) rather than NACK (as otherwise the UE cannot retransmit the packet without having resources and the NACK alone is useless). This corresponds to receiving an indirect NACK in the user apparatus 100 in response to a transmitted uplink data transmission 210A in the one or more uplink BWPs 402.

Figure 6B:
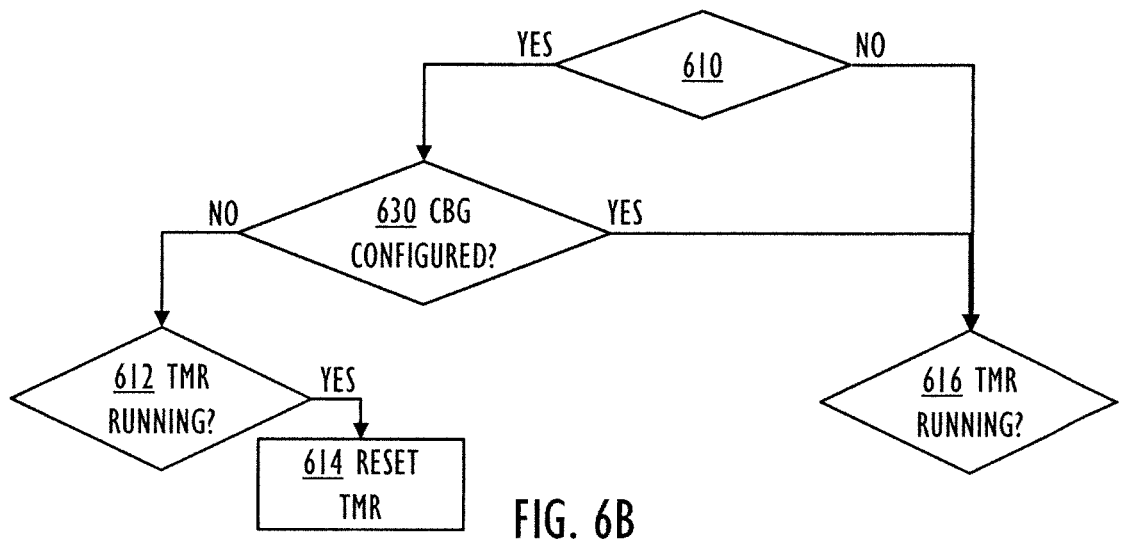
Figure 6C:
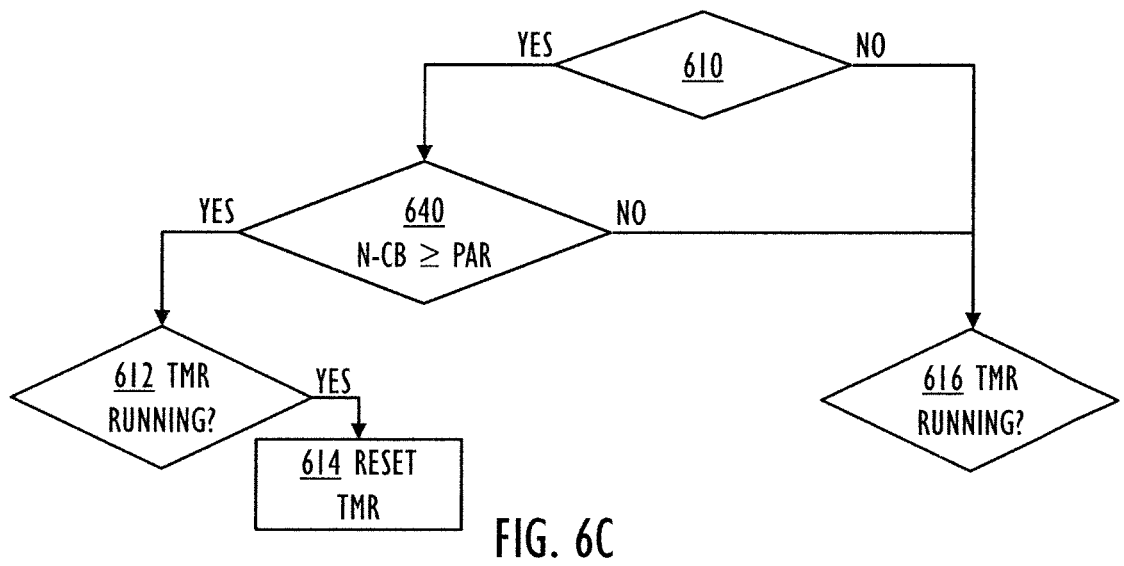
Figure 6D:
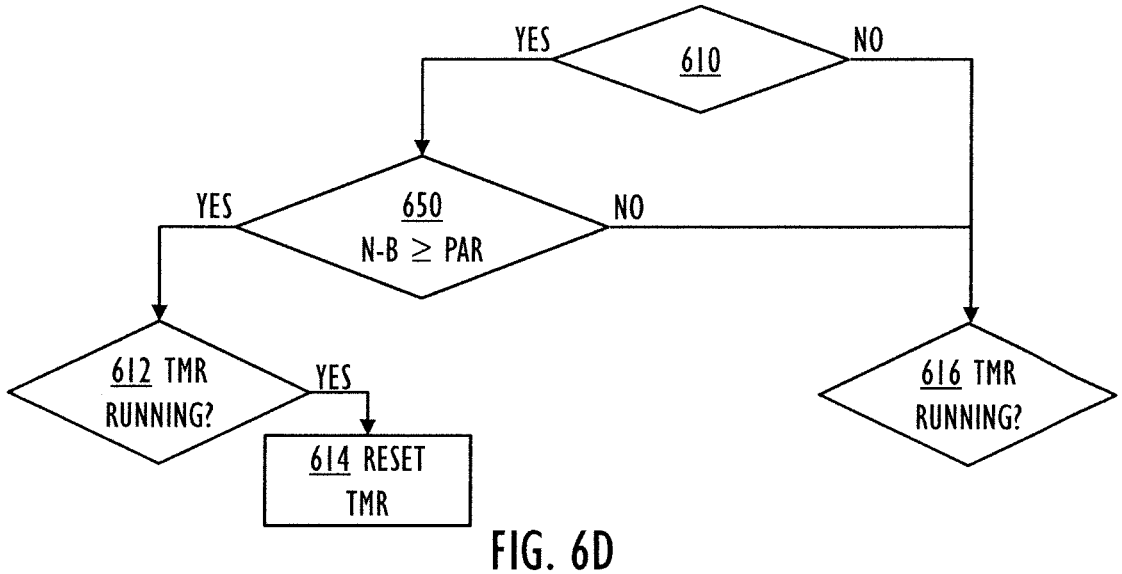

Let us next study FIG. 6B, FIG. 6C and FIG. 6D, which illustrate further example embodiments, providing, alone or in any combination with each other, additional conditions for resetting the timer. In an example embodiment, the timer is reset 614 in response to detecting 604, 610YES the need for the re-transmission 212, if a code block group CBG -based retransmission is not configured 630NO for the data transmission 210, 210A, 210B. If it were configured, the timer would not be reset as CBG-based retransmission would be made using the default BWP 400, 410.

In an example embodiment, the timer is reset 614 in response to detecting 604, 610YES the need for the re-transmission 212, if the number of code blocks or the number of bits having the need for the re-transmission 212 fulfills a predetermined condition. Two following example embodiments give examples of this predetermined condition.

In an example embodiment, the timer is reset 614 in response to detecting 604, 610YES the need for the re-transmission 212, if a number of code blocks having the need for the re-transmission is 640YES equal to or larger than a network configured parameter indicating a potential maximum allowed capacity on the default BWP 400, 410. If the number of code blocks were smaller, the timer would not be reset as the retransmission would made using the default BWP 400, 410.

In an example embodiment, the timer is reset 614 in response to detecting 604, 610YES the need for the re-transmission 212, if a number of bits having the need for the re-transmission is 650YES equal to or larger than a network configured parameter indicating a potential maximum allowed capacity on the default BWP 400, 410. If the number of bits were smaller, the timer would not be reset as the retransmission would made using the default BWP 400, 410.

In an example embodiment, the timer is an existing BWP-Inactivity Timer 216. In an example embodiment, BWP-Inactivity Timer 216 is defined as follows: bwp-InactivityTimer ENUMERATED {ms2, ms3, ms4, ms5, ms6, ms8, ms10, ms20, ms30, ms40, ms50, ms60, ms80, ms100, ms200, ms300, ms500, ms750, ms1280, ms1920, ms2560, spare10, spare9, spare8, spare7, spare6, spare5, spare4, spare3, spare2, spare1}. The duration in ms after which the UE falls back to the default Bandwidth Part. The value 0.5 ms is only applicable for carriers>6 GHz. When the network releases the timer configuration, the UE stops the timer without switching to the default BWP. With this example embodiment, the existing timer for BWP inactivity may be used for the described processing.

In an example embodiment, the timer is a new BWP-HARQInactivity Timer 218. With this example embodiment, a new timer is dedicated for the described processing.

In an example embodiment, the functionality of the apparatus 200 may be designed by a suitable hardware description language (such as Verilog or VHDL), and transformed into a gate-level netlist (describing standard cells and the electrical connections between them), and after further phases the chip implementing the functionality of the processor 202, memory 204 and the code 206C of the apparatus 200 may be fabricated with photo masks describing the circuitry.

In an example embodiment of FIG. 3, the apparatus 200 comprises: detection circuitry 300 configured to detect a need for a re-transmission of 212 a data transmission 210, 210A, 210B on one or more bandwidth parts BWP 402, 412 between a user apparatus 100 and a radio access network 104; and reset circuitry 302 configured to reset a timer in response to detecting the need for the re-transmission 212 using the detection circuitry, wherein an expiration of the timer causes automatic switching from using the one or more BWPs 402, 412 for the data transmission 210, 210A, 210B to using a default BWP 400, 410 for the data transmission 210, 210A, 210B. Naturally, the user apparatus 100 also comprises the transceiver circuitry 304 configured to implement the data transmission 210.

In an example embodiment of FIG. 2, a computer-readable medium 220 comprises computer program code 206A, which, when loaded into one or more processors 202 and executed by the one or more processors 202, causes an apparatus to perform a method comprising: detecting 604, 610YES a need for a re-transmission of a data transmission on one or more bandwidth parts BWP between a user apparatus and a radio access network; and in response to detecting 604, 610YES the need for the re-transmission, resetting 614 a timer, wherein an expiration 618 of the timer causes automatic switching 620 from using the one or more BWPs for the data transmission to using a default BWP for the data transmission.

The example embodiments of the apparatus 200 and the method of FIG. 6A, FIG. 6B, FIG. 6C and FIG. 6D may be used to enhance the operation of the computer program code 206A. In an example embodiment, the computer program code 206A may be in source code form, object code form, executable file, or in some intermediate form, for example. The computer-readable medium 220, may comprise at least the following: any entity or device capable of carrying computer program code 206A to the apparatus 200, a record medium, a computer memory, a read-only memory, an electrical carrier signal, a telecommunications signal, and a software distribution medium. In some jurisdictions, depending on the legislation and the patent practice, the computer-readable medium 220 may not be the telecommunications signal. In an example embodiment, the computer-readable medium 220 may be a non-transitory computer-readable storage medium.

A UE will have at least one common initial BWP (identified based on MIB/SIB1 signaling or the like) and may be configured with up to four dedicated BWP parts, among which one will be set as the first active BWP. The first active BWP is therefore the BWP used by UE during CONNECTED mode. On the contrary, the BWP operation during initial access—when the UE is moving from RRC IDLE or INACTIVE state to RRC CONNECTED state—requires the UE to use the initial BWP (also termed as initial active BWP) since that is the only BWP the UE knows based on MIB/SIB1. Then when the UE is in Connected mode, the UE may move from the first initial active BWP to the default BWP based on the expiration of the related inactivity timer.

It may be assumed that the UE is configured by the network with a small default BWP and a wide active BWP such that the UE uses the wide BWP for data transmissions and moves back to the default BWP afterwards based on bwp-InactivityTimer for energy saving purposes.

A retransmission (whose associated first transmission—which is assumed rather large—have happened in the wide active BWP) may happen in the currently active BWP or in the default BWP—if the UE switches to the default BWP before performing the retransmission—or in a new active BWP. This will depend on the configuration of bwp-InactivityTimer vs drx-RetransmissionTimerDL(UL) and drx-HARQ-RTT-Timer parameters.

In any case, after the bwp-InactivityTimer associated to the currently active BWP expires, the UE will switch to the default BWP, and monitor only the default BWP. This means that after the switch, in case retransmissions are required, they may happen either:

On the default BWP: if Code Block Group (CBG) based retransmission is needed, since only the code block(s) that failed have to retransmitted and that will likely fit into the small BWP.

On a new non-default BWP: if TB-based (Transmission block) retransmission is needed, since it is assumed that it won't fit into the small default BWP. This could be achieved either:

Via cross-carrier scheduling and cross-slot scheduling: after the switch to default BWP, the DCI received in the default BWP can point to PRBs in the previous active (non-default) BWP to schedule the retransmission there.

Or first DCI-based switching to a wide active BWP needs to happen and then retransmission can happen in the new active BWP. This may not be efficient, as introduces additional latency as well as increased power consumption.

In the context of the example embodiments, the procedure of automatic switch from the active BWP to the default BWP—based on the BWP inactivity timer—is addressed and optimizations are proposed related to the joint operations with HARQ. The intention is to provide better control on which BWP is used for the retransmissions, such to avoid the switch to the default BWP if it cannot accommodate the retransmission.

CBG-based transmission with single/multi-bit HARQ-ACK feedback is supported in NR Rel-15. The UE is semi-statically configured by RRC signaling to enable CBG-based retransmission.

The above semi-static configuration to enable CBG-based retransmission is separate for DL and UL.

In 3GPP NR system, to optimize the UE power consumption, discontinuous reception (DRX) is supported to dynamically switch the UE transceiver on-off according to the actual traffic demand. To realize DRX operation, the MAC entity may be configured by RRC with a DRX functionality that controls the UE's PDCCH monitoring periodicity and format. When in RRC_CONNECTED mode, if DRX is configured, the MAC entity may monitor the PDCCH discontinuously using the DRX operation; otherwise, the MAC entity shall monitor the PDCCH continuously. RRC may control DRX operation by configuring the following timers, and the NR unit below refer to the scheduling time unit:

drx-onDurationTimer: the number of consecutive NR unit(s) at the beginning of a DRX Cycle. Unit in milliseconds;

drx-InactivityTimer: the number of consecutive NR unit(s) after the scheduling slot in which a PDCCH indicates an initial UL or DL user data transmission for the MAC entity. Unit in milliseconds;

drx-RetransmissionTimerDL (per DL HARQ process): the maximum number of consecutive NR unit(s) until a DL retransmission is received;

drx-RetransmissionTimerUL (per UL HARQ process): the maximum number of consecutive NR unit(s) until a grant for UL retransmission is received;

drx-LongCycle: Long DRX cycle. Unit in milliseconds;

drx-ShortCycle: Short DRX cycle. Unit in milliseconds;

drx-ShortCycleTimer: the number of consecutive NR unit(s) the UE shall follow the Short DRX cycle;

drx-HARQ-RTT-TimerDL (per DL HARQ process): the minimum amount of NR unit(s) before a DL assignment for HARQ retransmission is expected by the MAC entity;

drx-HARQ-RTT-TimerUL (per UL HARQ process): the minimum amount of NR unit(s) before a UL HARQ retransmission grant is expected by the MAC entity.

It may be observed that the bwp-inactivityTimer is associated to a BWP and is started after the PDCCH indication is received indicating the BWP switching to a different BWP. When the timer is running, the "keep alive" message to reset (i.e., restart) the currently running bwp-inactivityTimer is DL signaling (PDCCH) and SPS data (either uplink or downlink). On the contrary, no dependence to the HARQ status is currently considered, which is addressed by the example embodiments.

As an alternative to the example embodiments, the network could set the bwp-inactivityTimer value larger than drx-RetransmissionTimerDL(UL)×drx-HARQ-RTT-TimerDL(UL) to ensure that all potential retransmissions happen in the current active BWP. However, that would reduce power saving for most of the cases: the packet error rate is typically in the order of 10%, so in the remaining 90% of the cases where successful UE reception/transmission happens, the UE could benefit from a quicker switch back to the default BWP, which is achieved by the example embodiments.

The example embodiments provide a method to optimize the UE automatic switch from the active BWP to the default BWP, by introducing a new BWP-InactivityTimer procedure as function of the HARQ information. The method comprises resetting or restarting the BWP-InactivityTimer at UE transmission or reception of one or more HARQ-NACK indications to avoid or delay/postpone the switch to the default BWP.

The example embodiments may allow UE sending or receiving HARQ retransmissions without incurring in additional energy consumption or requiring additional network signaling for switching back to a wide active BWP.

The example embodiments may make it flexible to accommodate both the CBG-based and TB-based retransmissions as well as any default BWP size/capacity.

Even though the invention has been described with reference to one or more example embodiments according to the accompanying drawings, it is clear that the invention is not restricted thereto but can be modified in several ways within the scope of the appended claims. Therefore, all words and expressions should be interpreted broadly, and they are intended to illustrate, not to restrict, the example embodiments. It will be obvious to a person skilled in the art that, as technology advances, the inventive concept can be implemented in various ways.

The invention claimed is:

1. An apparatus comprising:
  processing circuitry; and
  memory circuitry including computer program code, where the memory circuitry and the computer program code configured to, with the processing circuitry, cause the apparatus to:
    detect a need for a retransmission of a data transmission on one or more bandwidth parts (BWP) between a user apparatus and a radio access network in response to triggering a hybrid automatic repeat request negative acknowledgement (HARQ-NACK) indications to the radio access network; and
    in response to detecting the need for the retransmission, reset a BWP-HARQ inactivity timer to a time value that is larger than the following: a maximum number of consecutive new radio units until a downlink retransmission is received multiplied by a minimum amount of new radio units before a downlink assignment for HARQ retransmission is expected by a media access control entity, wherein an expiration of the timer is configured to cause automatic switching from using the one or more bandwidth parts for the data transmission to using a default bandwidth part for the data transmission.

2. The apparatus of claim 1, wherein the new radio units refer to a scheduling time unit.

3. The apparatus of claim 1, wherein the data transmission is sent or received.

4. The apparatus of claim 1, wherein the user apparatus is portable computing device that includes wireless mobile communication devices.

5. The apparatus of claim 1, wherein the BWP-HARQ inactivity timer is a new BWP-HARQ inactivity timer.

6. The apparatus of claim 1, wherein the one or more bandwidth parts is one or more active bandwidth parts of a component carrier allocated during a connected mode for the user apparatus.

7. The apparatus of claim 1, wherein the default bandwidth part is an initial active bandwidth part allocated during an initial access with the user apparatus.

8. The apparatus of claim 1, wherein the apparatus is the user apparatus.

9. A method comprising:
  detecting a need for a retransmission of a data transmission on one or more bandwidth parts BWP between a user apparatus and a radio access network in response to triggering a hybrid automatic repeat request negative acknowledgement (HARQ-NACK) indications to the radio access network; and
  in response to detecting the need for the retransmission, resetting a BWP-HARQ inactivity timer to a time value that is larger than the following: a maximum number of consecutive new radio units until a downlink retransmission is received multiplied by a minimum amount of new radio units before a downlink assignment for HARQ retransmission is expected by a media access control entity, wherein an expiration of the timer causes automatic switching from using the one or more bandwidth parts for the data transmission to using a default bandwidth part for the data transmission.

10. The method of claim 9, wherein the new radio units refer to a scheduling time unit.

11. The method of claim 9, wherein the user apparatus is portable computing device that includes wireless mobile communication devices.

12. The method of claim 9, wherein the data transmission is sent or received.

13. The method of claim 9, wherein the BWP-HARQ inactivity timer is a new BWP-HARQ inactivity timer.

14. The method of claim 9, wherein the one or more bandwidth parts is one or more active bandwidth parts of a component carrier allocated during a connected mode for the user apparatus.

15. The method of claim 9, wherein the default bandwidth part is an initial active bandwidth part allocated during an initial access with the user apparatus.

16. A non-transitory computer-readable medium comprising computer program code, which, when loaded into one or more processors and executed by the one or more processors, causes an apparatus to perform a method comprising:
  detecting a need for a retransmission of a data transmission on one or more bandwidth parts BWP between a user apparatus and a radio access network in response to triggering a hybrid automatic repeat request negative acknowledgement (HARQ-NACK) indications to the radio access network; and
  in response to detecting the need for the retransmission, resetting a BWP-HARQ inactivity timer to a time value that is larger than the following: a maximum number of consecutive new radio units until a downlink retransmission is received multiplied by a minimum amount of new radio units before a downlink assignment for HARQ retransmission is expected by a media access control entity, wherein an expiration of the timer causes automatic switching from using the one or more bandwidth parts for the data transmission to using a default bandwidth part for the data transmission.

17. The non-transitory computer-readable medium of claim 16, wherein the new radio units refer to a scheduling time unit.

18. The non-transitory computer-readable medium of claim 16, wherein the user apparatus is portable computing device that includes wireless mobile communication devices.

19. The non-transitory computer-readable medium of claim 16, wherein the data transmission is sent or received.

20. The non-transitory computer-readable medium of claim 16, wherein the BWP-HARQ inactivity timer is a new BWP-HARQ inactivity timer.

* * * * *